US007030902B2

(12) United States Patent
Jacobs

(10) Patent No.: US 7,030,902 B2
(45) Date of Patent: Apr. 18, 2006

(54) ETERNALISM, A METHOD FOR CREATING AN APPEARANCE OF SUSTAINED THREE-DIMENSIONAL MOTION-DIRECTION OF UNLIMITED DURATION, USING A FINITE NUMBER OF PICTURES

(76) Inventor: Kenneth Jacobs, 94 Chambers St., New York, NY (US) 10007

( * ) Notice: Subject to any disclaimer, the term of this patent is extended or adjusted under 35 U.S.C. 154(b) by 595 days.

(21) Appl. No.: 10/054,607

(22) Filed: Jan. 22, 2002

(65) Prior Publication Data

US 2002/0135699 A1 Sep. 26, 2002

Related U.S. Application Data

(60) Provisional application No. 60/263,498, filed on Jan. 23, 2001.

(51) Int. Cl.
*H04N 13/00* (2006.01)
(52) U.S. Cl. .............................. 348/42; 348/51; 348/58; 348/78; 348/97; 348/578; 349/15; 351/45; 359/464
(58) Field of Classification Search ................ 348/597, 348/598, 51, 53, 54, 40, 42, 44, 58, 78, 97, 348/402.1, 416.1, 413.1, 430.1, 431.1, 578; 359/446, 23, 26, 465, 464, 466, 462; 351/237, 351/233, 209, 49, 46, 45, 158; 345/32, 33, 345/8, 419; 382/154, 107; 375/240.16; 349/15, 13
See application file for complete search history.

(56) References Cited

U.S. PATENT DOCUMENTS

| | | | | |
|---|---|---|---|---|
| 4,907,860 | A * | 3/1990 | Noble | 349/15 |
| 5,144,344 | A * | 9/1992 | Takahashi et al. | 351/44 |
| 5,264,877 | A * | 11/1993 | Hussey | 351/45 |
| 5,510,831 | A * | 4/1996 | Mayhew | 348/47 |
| 5,654,786 | A * | 8/1997 | Bylander | 351/49 |
| 5,717,415 | A * | 2/1998 | Iue et al. | 345/8 |
| 5,920,374 | A * | 7/1999 | Vaphiades et al. | 351/237 |
| 6,198,524 | B1 * | 3/2001 | Osgood | 352/43 |
| 6,392,689 | B1 * | 5/2002 | Dolgoff | 348/44 |
| 6,510,002 | B1 * | 1/2003 | Tsang | 359/465 |
| 6,598,968 | B1 * | 7/2003 | Davino | 351/49 |

* cited by examiner

*Primary Examiner*—Michael Lee
*Assistant Examiner*—Jean W. Desir
(74) *Attorney, Agent, or Firm*—Lucas & Mercanti, LLP

(57) ABSTRACT

The method uses three pictures, A, B and C, two of which are substantially similar pictures having images, A, B, and one that is dissimilar, usually a solid color, C. Continuous movement is created by repetitively viewing the series A, B, C. Additionally, each picture can be blended or superimposed to create a blended A/B, C/A and B/C and then the blend put together with the others, in a series, C/A, A, A/B, B, B/C, C. This series is then repeated a plurality of times to create an illusion of sustained, ongoing motion with a degree of three-dimensionality, with synchronous Pulfrich light-filtering available to enhance the effect.

11 Claims, 12 Drawing Sheets

INDIVIDUAL

SERIES

REPEATING SERIES

INDIVIDUAL

SERIES

REPEATING SERIES

INDIVIDUAL

SERIES

REPEATING SERIES

SERIES

REPEATING SERIES

INDIVIDUAL

SERIES

REPEATING SERIES

INDIVIDUAL

A　　　　　　B　　　　　　C

SERIES

A　　　　　　B　　　　　　C

REPEATING SERIES

C　　A　　B　　C　　A　　B　　C

INDIVIDUAL

D  Fig. 8a  E

SERIES

D  E  C

REPEATING SERIES

C  D  E  C  D  E  C

SERIES

REPEATING SERIES

INDIVIDUAL

G            H

SERIES

G           H           C

REPEATING SERIES

C    G    H    C    G    H    C 1    2    3

ETERNALISM, A METHOD FOR CREATING AN APPEARANCE OF SUSTAINED THREE-DIMENSIONAL MOTION-DIRECTION OF UNLIMITED DURATION, USING A FINITE NUMBER OF PICTURES

CROSS REFERENCE TO RELATED APPLICATIONS

This application claims the priority of provisional application Ser. No. 60/263,498 filed Jan. 23, 2001.

BACKGROUND OF THE INVENTION

1. Field of the Invention

This invention relates to visual art and, more particularly, to a method for producing an appearance of continuous movement using a finite number of pictures, i.e., as few as two pictures.

2. Art Related to the Invention

Movies are generally made from a series of single, non-repetitive pictures which are viewed at a speed that provides the viewer with the appearance of continuous movement. These series of single pictures are positioned in adjacent picture frames, in sequential order, wherein adjacent pictures are substantially similar to each other and vary only slightly from each other. Usually, movies are created using movie cameras, which capture the actual movement of the object; with animated movies, a series of individual pictures or cells are created, usually by hand or computer, and assembled in sequential order where adjacent pictures of a scene are substantially similar to each other and vary only slightly. Standard film projection is 24 frames per second, American video standard NTSC is 30 f.p.s.

The appearance of continuous movement, using only two substantially similar pictures, has been accomplished in live performance by simultaneous projection of both images onto a screen, wherein one picture may be slightly off-set from the other picture as they appear on the screen, and by rotating a two-bladed propeller, wherein the propeller blades are set off from one another by 180 degrees, in front of and between the two projectors such that the two images are made to both alternate and overlap in their appearances, with both images in turn alternating with an interval of complete darkness onscreen when both projections are blocked by the spinning propeller. A viewer, using no special spectacles or visual aids, perceives a scene of limited action (with a degree of illusionary depth) that can be sustained indefinitely in any chosen direction: an evolving yet limited action appears to be happening continually without visible return-and-start-over repetition. Thus the viewer sees a visual illusion of an event impossible in actual life. Similarly, the manner in which things appear in depth are likely to be at odds, often extremely so, with the spatial character of the original photographed scene. Further, the character of movement and of depth has been made malleable in the hands of the projectionist during performance (so much so that such film-performance has been likened to a form of puppetry); the physical shifting of one of the two projections changes the visual relationship between them and thereby the character of the screen event produced. Similarly, small changes during performance in speed, placement and direction of propeller spin will cause radical changes in the visual event produced onscreen.

Other visual arts which relate to the present invention are the Pulfrich filter. For one program, titled "Bitemporal Vision: The Sea", viewers were invited to place a Pulfrich light-reducing filter before one eye to both enhance and transform the already apparent depth character of the presentation.

Limited to presentation in live performance, such unique visual phenomena as described has been transient theater. Attempts to capture the phenomena by way of video-camera recording of the screen-image have been disappointingly compromised, so that—in over 25 years of such presentation (of so-called "Nervous System Film Performances") no attempt has been made to commercialize such recordings.

SUMMARY OF THE INVENTION

A method has now been discovered for originating visual illusions of figures and spaces in continuous movement in any chosen direction using a finite number of pictures (as few as two pictures) that can be permanently stored and copied and displayed on motion picture film or electronic media. The method of the present invention entails repetitive presentation to the viewer of at least two substantially similar image pictures alternating with a third visual interval or bridging picture that is substantially dissimilar to the other substantially similar pictures in order to create the appearance of continuous, seamless and sustained directional movement.

Specifically, two or more image pictures are repetitively presented together with a bridging interval (a bridging picture) which is preferably a solid black or other solid-colored picture, but may also be a strongly contrasting image-picture readily distinguished from the two or more pictures that are substantially similar. In electronic media, the bridge-picture may simply be a timed unlit-screen pause between serial re-appearances of the two or more similar image pictures. The rolling movements of pictorial forms thus created (figures that uncannily stay in place while maintaining directional movement, and do not move into a further phase of movement until replaced by a new set of rotating units) is referred to as Eternalisms, and the process of composing such visual events is referred to as Eternalizing.

The three film or video picture-units are arranged to strike the eyes sequentially. For example, where A and B are the image pictures and C is the bridging picture, the picture units are arranged (A, B, C). This arrangement is then repeated any number of times, as a continuing "loop". The view of this continuing loop allows for the perception of a perceptual combining and sustained movement of image pictures (A, B). Naturally, if this loop is placed on a film strip, then it is arranged and repeated in a linear manner (A, B, C, A, B, C, A, B, C, A, B, C, etc.). The repetition of the sequence provides an illusion of continuous movement of the image pictures (A, B); with bridging picture (C), preferably in the form of a neutral or black frame, not consciously noticed by the viewer at all, except perhaps as a subtle flicker.

A more fluid or natural illusion of continuous movement from a finite number of image pictures is provided by using two of each of the three pictures and repeating the cycle of the pairs sequentially, or by blending adjacent pictures together on an additional picture-frame and placing the blended picture between the pictures in sequential order. The two image pictures (A, B) are now blended with each other to produce (A/B); the two image pictures are also blended with the bridging picture to produce (C/A and B/C), and then all pictures repeat in a series starting with the bridging picture (C, C/A, A, A/B, B, B/C) each blended picture being represented by the two letters with a slash therebetween).

This series is repeated a plurality of times to sustain the illusion as long as desired. Repeating the sequence with additional blended frames provides more fluid illusion of continuous movement of the (optically combined) two image pictures (A, B).

Additionally, various arrangements of the pictures and the blends can be employed in the present invention and need not be the same each time. By varying the order of pictures in the sequence, the beat or rhythm of the pictures is changed. For example, A, B, C can be followed by A, A/B, B, B/C, C which in turn is followed by A, A, A/B, B, B, B, B/C, C, C, C, C, i.e. A, B, C, A, A/B, B, B/C, C, A, A, A/B, B, B, B, B/C, B/C, C, C, C, C, A, B, C, A, etc.

With A and B frames being similar images (such as a pair of normal two-eye perspective views of a three-dimensional scene from life), and frame C a contrasting frame (preferably a solid-color picture instead of an image-picture) relative to A,B, frame C acts as essentially a "bridge-interval" placed between recurrences of A,B. Any color can be used for the contrasting frame C: for example, blue, white, green; however, black is usually preferred. The contrasting frame can also be chosen from one of the colors in one of the two image pictures. For example, if one of the image pictures has a large patch of dark blue, then the color of the contrasting frame, bridging picture, may be dark blue.

Blending of the pictures is accomplished in any manner which allows for both pictures to be merged in the same picture frame. Thus, the term "blending" as used in the specification and claims can also be called superimposing, since one picture is merged with the other picture. Blending is done in a conventional manner using conventional equipment, suitably, photographic means, a computer, an optical printer, or a rear screen projection device. For animated art, the blending can be done by hand as in hand drawing or hand painting. Preferably, a computer is used. Suitable software programs include Adobe Photoshop, Media 100 and Adobe After Affects. Good results have been obtained with Media 100 from Multimedia Group Data Translations, Inc. of Marlborough, Mass., USA.

When using Media 100, suitable techniques include additive dissolving, cross-dissolving, and dissolving-fast fix and dither dissolving.

In blending the pictures, it is preferred to use 50% of one and 50% of the other. However, the blending can be done on a sliding scale, for example with three blended pictures, a sliding scale of quarters, i.e. 75% A/25% B, 50% A/50% B, 25% A/75% B. Good results have been obtained with a 50% /50% mix, i.e. a blend of 50% A/50%B.

The two image pictures, A and B, which are visually similar to each other, are preferably taken from side-by-side frame exposures from a motion picture film of an object or image or that is moving such that when one is overlaid with the other, only a slight difference is noted between the two images.

Alternatively, the two image pictures are identical except that one is off-center from the other. The direction of the off-center, e.g. up, down, right, or left, will determine which direction the series provides the appearance of movement, e.g. if image picture B is off-center from image picture A to the right of A, the series of C, C/A, A, A/B, B, B/C will have the appearance of moving from left to right. Likewise, if you reverse the order of appearance then the appearance of movement will be to the left.

More than two image pictures can be used in the invention. Likewise, more than one bridging picture can be used in the present invention. For example, four image pictures can be used along with one bridging picture. In this case, the series for the four image pictures, designated A, B, D and E, would be: C, A, B, D, E; or a 50/50 blend C, C/A, A, A/B, B, B/D, D, D/E, E, E/C; or side-by-side pairs, C, C, A, A, B, B, D, D, E, E.

The image picture need not fill the picture frame. Furthermore, more than one image picture can be employed per frame. Thus, the picture frame can contain a cluster of images and the image or images need not necessarily filling up the entire frame. Also, only portions of image pictures can be used to form the image used in the present invention.

Also, image pictures and portions of the image picture can be combined such that the combination is used as the second image picture. The portion of the image picture is offset from the first image picture when they are combined such that there is an appearance of movement. For example, a window from image picture A can be moved slightly while the background remains the same, the picture with the moved window is designated image picture B and the two combined to create the appearance of the window moving and/or enlarging or shrinking in size. In this case, both picture A and picture B are identical except for the placement of the window in the image picture. The same can also be done by using an identical background in both image pictures and superimposing on both pictures an image which is positioned slightly different in each picture. The image could be a window, as before, of a man walking, for example.

The number of series which are put together can be finite if it is made on a length of film or infinite if it is set on a continuous cycle or loop wherein it repeats itself.

Broadly, the invention is a method for creating an appearance of continuous movement with a plurality of picture frames using three or more pictures, said method comprising:

a) selecting at least two image pictures, a first image picture and a second image picture, which are visually similar;

b) selecting a bridging picture which is dissimilar to said image pictures;

c) arranging said pictures in a sequential order to create a first series of pictures, said sequential order being one or more first image pictures, one or more second image pictures, one or more bridging pictures;

d) placing said first series of pictures on a plurality of picture frames wherein each picture of said first series is placed on a single frame; and e) repeating the first series of pictures a plurality of times to create a continuous plurality of picture frames having said first series thereon, such that when said plurality of picture frames are viewed, an appearance of continuous movement is perceived by a viewer.

Preferably, step (c) is replaced with the steps comprising:

(c1) blending said first image picture with said bridging picture to obtain one or more blended first-bridging picture;

(c2) blending said first image picture with said second image picture to obtain one or more blended first-second picture;

(c3) blending said second image picture with said bridging picture to obtain one or more blended second-bridging picture;

(c4) arranging said pictures in a sequential order of one or more bridging pictures, one or more of said blended first-bridging picture, one or more of said first image picture, one or more of said blended first-second pictures, one or more of said second image picture, one or more of said blended second-bridging picture to create a first series of pictures.

An artificial 3-D image can be achieved by the present Invention, as will be described in more detail below. Another way to obtain an artificial 3-D image is by a method of electronic switching of Pulfrich light-filtering before right or left eye, synchronized with screen action.

The start or end of the sequences doesn't matter since the sequence is placed in a continuous loop, however, the order of the pictures in the loop is critical in the practice of the present invention.

These and other aspects of the invention may be more fully understood by reference to one or more of the following drawings which have been chosen for illustration purposes.

BRIEF DESCRIPTION OF THE DRAWINGS

FIGS. 8a–8c illustrates the same women in two different perspectives (not apparent to normal viewing as pictured here), joined to create an Eternalism;

DETAILED DESCRIPTION OF THE INVENTION

Figure 1A:
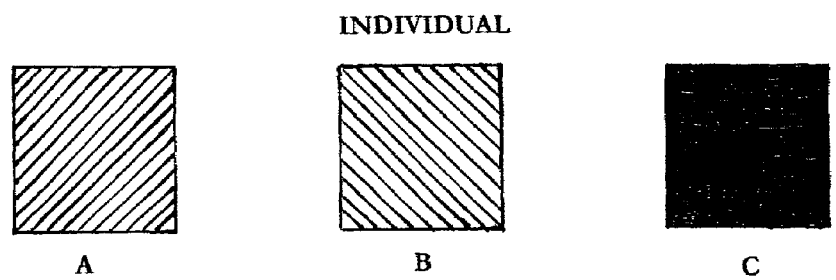
FIGS. 1a–1c illustrates the present invention with three pictures.

FIG. 1a illustrates the three pictures that are employed in the method of this invention. Picture A, illustrated with lines slanting upward left to right, and Picture B, illustrated with lines slanting downward from left to right. Both pictures A and B are single frame photographs such as two side-by-side frames taken from a movie film showing movement of an object, for example, a woman walking down a street or a man walking his dog. Such side-by-side frames would be similar to each other but not identical. Picture C is a solid black picture.

Figure 1B:
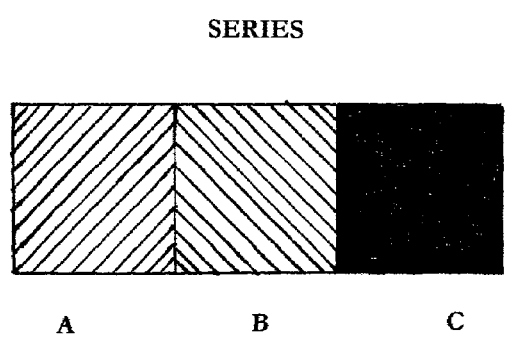
Figure 1C:
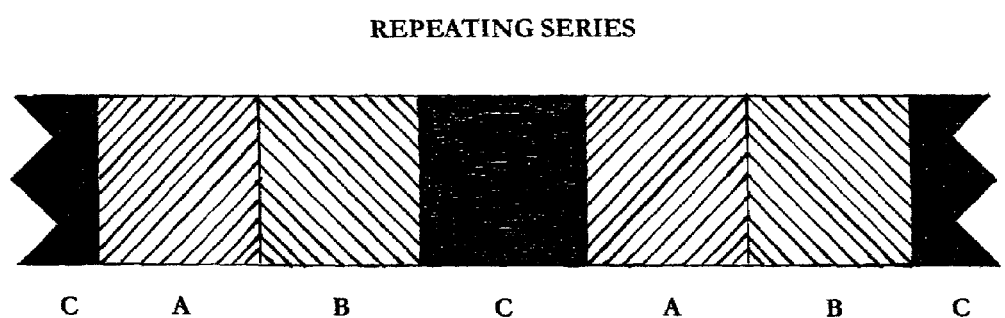

In FIG. 1b pictures A, B and C are arranged in sequential order, and placed on picture frames to form a series. In FIG. 1c this series is then repeated to produce the appearance of movement by pictures A and B.

Figure 2A:
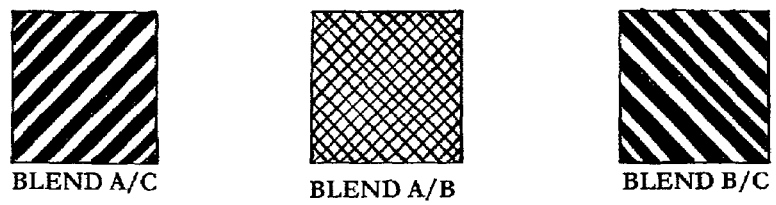
FIGS. 2a–2c illustrates the present invention using three pictures along with blended pictures.

Turning to FIG. 2a and the use of blended pictures, the three pictures are combined to produce a blend of C/A, blend of A/B and a blend of B/C by using Adobe Photoshop or another program to make a 50/50 blend of the three pictures.

Figure 2B:
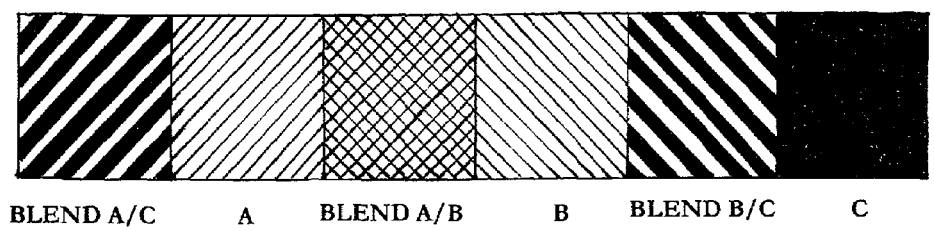
Figure 2C:
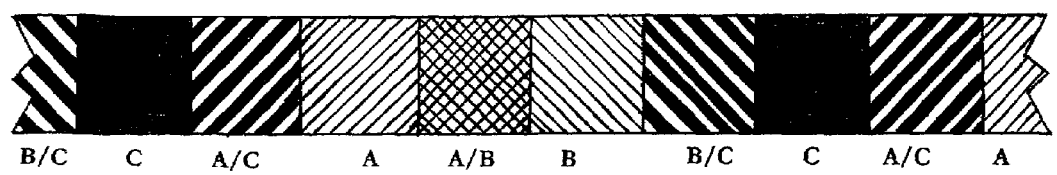

In FIG. 2b, all six pictures are placed side-by-side to create a series and the series is copied to create a continuous or semi-continuous film video or computer sequence where the series is repeated a plurality of times as shown in FIG. 2c.

Figure 3A:
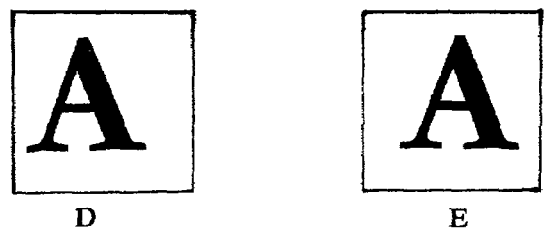
FIGS. 3a–3c illustrates the present invention using the same picture wherein one is offset from the other.
Figure 3B:
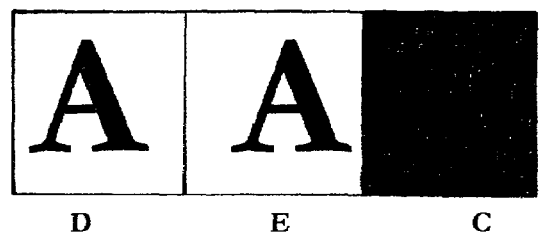
Figure 3C:
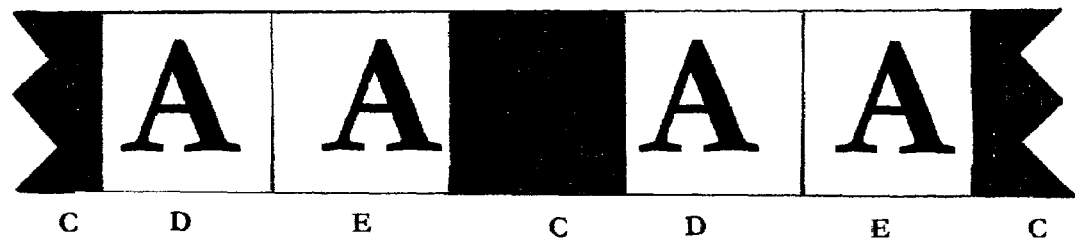

FIGS. 3a–3c illustrates an alternative three pictures that are employed in the method of this invention. Picture D and Picture E both illustrate a capital A, however, in Picture D, the capital A is aligned with the center of the frame while in Picture E the A is off-set to the right of the center of the frame (exaggerated here to be visible; in actual practice the displacement of figures might be so subtle as to not be discernable as illustrated here). Picture C is identical to Picture C in FIG. 1a.

The capital A is chosen for FIGS. 3a–3c for illustration purposes and could be a single photograph of anything.

The three pictures are placed side-by-side to form a series. Finally, the series is copied a plurality of times to form a repeating series. The repeating series in FIG. 3c creates the optical illusion that the letter A is moving from left to right and, if one letter A were to be slightly different in size from the other, the letter would appear to be moving in depth, i.e. given a third dimension.

In FIGS. 3a–3c the background of Picture E is identical to the background of Picture D except that the image A is off-set slightly to the right.

Figure 4A:
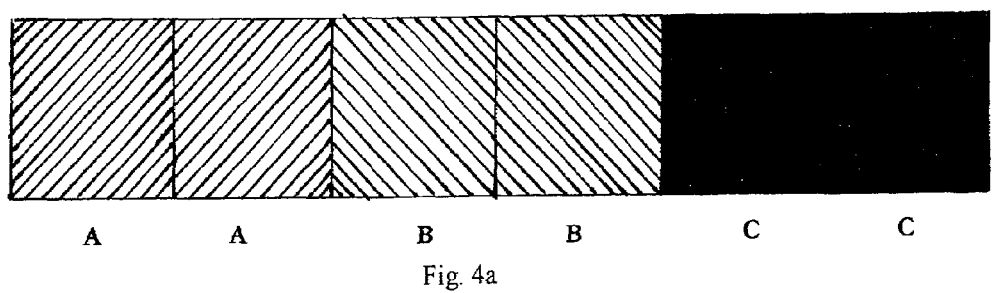
FIGS. 4a–4b illustrates the present invention with side-by-side pairs of pictures.
Figure 4B:
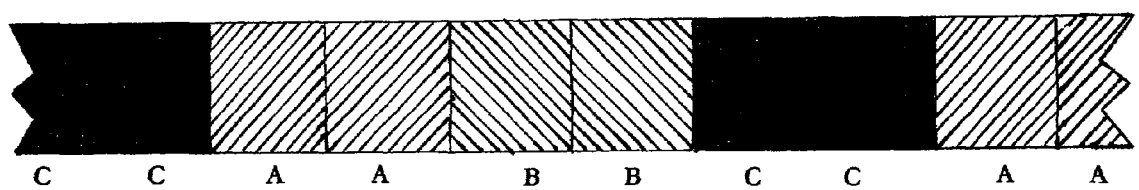

FIGS. 4a–4b illustrates the present invention where the series is two of each picture placed in side-by-side frames. It has been found that two pictures side-by-side are visually equivalent to a blend. In other words, a series of A, A, B, B, C, C is visually equivalent to a series of C/A, A, A/B, B, B/C, C.

Additionally, a series made in accordance with the present invention need not be uniform in that the pictures can be arranged to provide a different rhythm or beat to the film. For example, the series could be: C/A, C/A, A, A/B, A/B, B, B, B, B/C, C, C, C. Different arrangements provide different visual perceptions.

Furthermore, a plurality of different series can be combined together, i.e. C/A, A, B, B, C with C/A, C/A, A, B, B, C, C to form C/A, A, A, B, B, C, C/A, C/A, A, B, B, C, C.

Figure 5A:
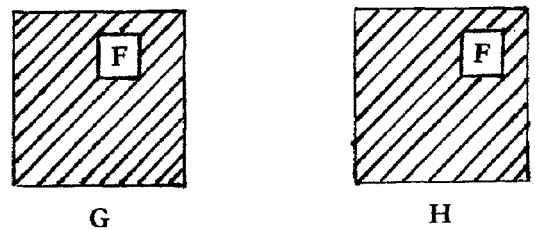
FIGS. 5a–5c illustrates the present invention wherein pictures G and H are identical but image F has been imposed in a slightly different location.
Figure 5B:
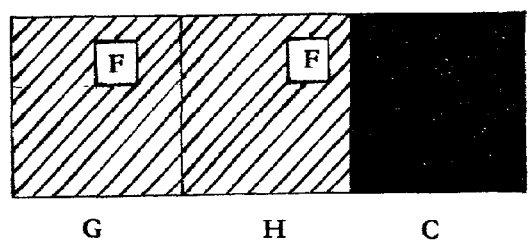
Figure 5C:
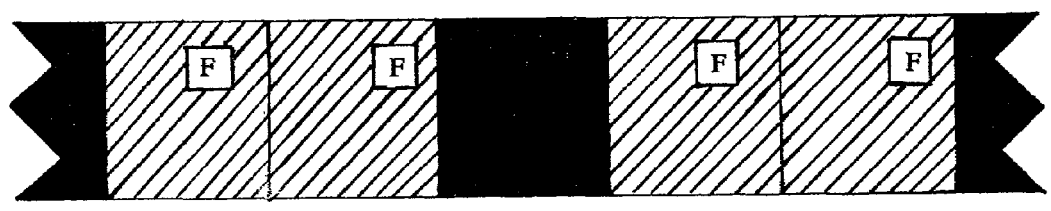

FIGS. 5a–5c illustrates the invention where both pictures are identical except for the position of a superimposed image F on the pictures. Image F could be taken from the original picture G or could be taken from another picture, which is separate and distinct from pictures G and H. For example, pictures G and H could have the common background of a country side road while image F is a man walking his dog. In picture G, the man and his dog is placed at one location while on picture H the man and his dog is placed at a different location on the country road. By viewing the repeating of a series of G, H, C, a viewer is given with the impression that the man is walking his dog down the road, from top of the frame towards the bottom of the frame, appearing to be continually moving in the same direction without changing his actual position.

Furthermore, image pictures can be identical except that when they are arranged in the frame, one is oriented slightly tilted relative to the other. The repeating series provides the visual perception that the picture is spinning.

Also, the size of or the orientation of image F in FIGS. 5a–5c can be varied while maintaining the location of image F. Varying the size gives the viewer the impression that the man is walking forward or backward, depending on the order in which pictures are arranged. Changing the orientation or tilting of image F leaves the viewer with the impression that the man is spinning.

The repeating series can be viewed in any media, it could be digitalized or placed on conventional film for viewing.

The movement created by the invention is seamless movement, sustained fluid entirely on-going movement.

Continuous movement means the illusion of a progressive action that can sustain as such into infinite time. For instance, a door beginning to open, it keeps beginning to open without ever progressing to the stage of actually opening. A door, in reality, in order to repeat this very limited movement, would have to move back and forth, recovering territory in order to go forward again, but in this visual illusion the door only moves forward. A normal film or video might approach this effect by multiple printing of the picture frames depicting only the forward motion, so that a return motion would be hidden from audience eyes, but the effect would be of a visual stutter; the action would be repeating, and not continuous. The "stutter" could be made less obvious and percussive by dissolving head frames of the shot into tail frames, but only with some subject matter (i.e., a waterfall) might the repeat character of the motion not be apparent.

The appearance of transfixed continuous motion (a going without going anywhere) is created in this invention from a specific employment of flicker, the contrast created by viewing the slight shifting of a pictured form or forms between the image pictures in opposition to the bridging picture. Movies have always been dependent for their illusion of continuity on flicker-rates; silent movies filmed at 16 frames per second required 3-bladed shutters not only to block projection light during the successive replacing of frames but also to twice interrupt the display of each frame so as to achieve a flicker rate that the viewer would mistakenly see as uninterrupted light. Slow cranking of the film through the projector gave rise to "the flickers" as a pejorative. Video and computer image-continuity depends likewise on rapid on-off display. The present invention purposely makes flicker apparent, utilizing the effects of emphatic flicker on the human optical/nervous system to create uncanny time and space illusions.

Simple alternation of a single image picture with intervals of blackness (or any other interrupting color/s) is enough to create subtle illusions of continual sliding movement across the screen. Alternations of two image pictures with an interrupting interval of a solid colored picture provides any number of continuous motions, including motion into illusionistic depth. While such screening-illusions of movement and depth resemble movements and depths as seen in actuality; this is a creative artistic method and not intended as a reliable way of reporting the actuality that may have existed in front of a camera.

As noted above, no special viewing devices are required to view the present invention, although certain effects can be enhanced or put through interesting changes when viewed with a filter intercepting and reducing light to one eye; the "Pulfrich Effect".

Remarkably, with the present invention, depth illusions can be experienced even by the single-eyed person. Normally our perception of depth, stereopsis, depends on properly functioning binocular vision, two eyes working in tandem with each other; one of the benefits of this invention is to offer visual depth experience to those deprived of such experiences by physical defect. Because contrasting perspectival information is available to both or either eye, a single eye becomes sufficient to deliver the information to the brain when employing the present invention.

The present invention is best created on the computer, to be viewed on the computer or transferred to film or any video format. It can also be created directly onto film or video but the precision control possible with the computer is lacking.

The present invention can employ very small shifts in the placement of objects as seen in one picture in relationship to another similar picture. Such small object-placement shifts are also to be found in the simultaneously exposed pairs of frames made with a stereo still-camera, its two lenses placed horizontally apart approximately the distance between human eyes. The stereo still-camera offers object-placement differences derived, as with our two eyes, from a fixed interval of space: the twin perspectives recorded by lenses 2½ inches apart. The degree of inter-ocular distance, as it is called, enormously affects the character of depth to be seen when the stereo-pair is properly viewed one picture to each eye; depth would seem very distorted, either too shallow or too extended (with other depth aberrations) if the distance between our eyes was not being matched by the two-lens stereo-camera.

In contrast to stereo-camera photography, with the single-lens motion picture camera (film or video), exploitable difference between like images arises from the interval of time between picture-exposures, during which the objects filmed shift in spatial relationship to each other; or/and the camera itself moves, capturing the 3-dimensional scene from another perspective, and thus shifting two-dimensional placement of pictured objects (which may not have moved in actuality) as recorded exposure to exposure. Because distance or direction traversed by the camera between exposures is not constant, nor movement by subjects recorded under photographer control, the visual equation of two-dimensional similarities and differences from which 3-dimensional movements will be constructed can not produce scenes as reliably life-like as can simultaneous stereo-exposures with a fixed horizontal distance of 2½ inches between a pair of lenses. Eternalism 3-D movements made from sequential exposures are not intended to offer scientific data pertaining to reality but instead to provide odd and expressive impossible-in-reality impressions.

The stereo still-camera provides a pair of mentally combinable left and right eye flat image pictures; viewed one picture to each eye, similarities and differences are automatically assessed and a semblance of familiar depth is seen. We gaze from plane to plane into a seeming depth, the angling of our two eyes "crossing" for close objects and spreading to parallel alignment for very distant ones (Yet we remain focused on the same plane in depth, the actual plane of the picture surface; in life, we constantly refocus as well as angle for different distances.) We are not conscious, either in actual life or when looking into such artificial depths, of the doubling of forms (as they fall back into 2-dimensionality) at distances that we are not at the moment angling for. This automatic angling operation of the eyes cannot happen when looking with both eyes at the same territory of flat picture surface. The coinciding of opposing 2-dimensional perspectival viewings of an object (by which volume can be conceived by the mind) must be done for the viewer, a task greatly enabled by the computer.

The present invention revolves each set of picture-units in place, but if a figure from one perspective is not placed in a correspondingly similar position in its frame (and in matching horizontal alignment) with its representation as recorded from another perspective, there is only a 2-dimensional jiggering with no volume illusion or continuous direction of movement created. With the computer, one can slide and place one picture, or an area of that picture, into exact relationship with a matching picture or area so as to achieve the precise effect desired. (A recorded object becomes an area within a flat picture-image.) The slightest advance in a particular direction of the contour of one area in relation to its match-up area determines movement in that direction. Slight shrinking or enlargement of one area compared to the other creates a "zooming" in or out effect. A problem in overlaying one entire picture over another in order to match up one area usually means other areas will not coincide, not synchronize; but the computer allows for each area to be matched separately and inlaid into the scene according to one's depth-movement intentions for each area. The crazy-quilt artificiality of a scene can be hidden or obvious, its parts drawn from a single-pair source of related images or from as many sources as desired. Photo-images can be mixed with or replaced by drawn and painted imagery. The scene can imitate real life one moment and veer off into impossibility the next.

Again, although only two image pictures are usually cycled, more than two can be worked into a cycle to create a particular effect. Following and inventing variants on the directions above, and the formula as described below for sequencing frames, will create the impression of solid entities moving in a charmed dimension where normally transient physical gestures can endure forever. In fact, computer interactivity can mean the viewer deciding how long the effects of each series continues. Further interactivity will give the viewer the option to place picture of his/her own choice into this unique cycling system.

Figure 6A:
FIGS. 6a–6c illustrates pictures of two women in Eternalism with two pictures.
Figure 6A:
Figure 6A:
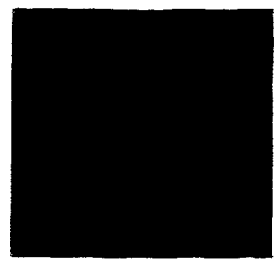
Figure 6B:
Figure 6B:
Figure 6B:
Figure 6C:

FIGS. 6a–6c shows two phases of an action, A & B, plus black bridge-frame C. We see the pictures separately in FIG. 6a; made sequentially adjacent to each other in FIG. 6b and presented as a repeating series of pictures, as a "loop" or "cycle", in FIG. 6c.

Figure 7A:
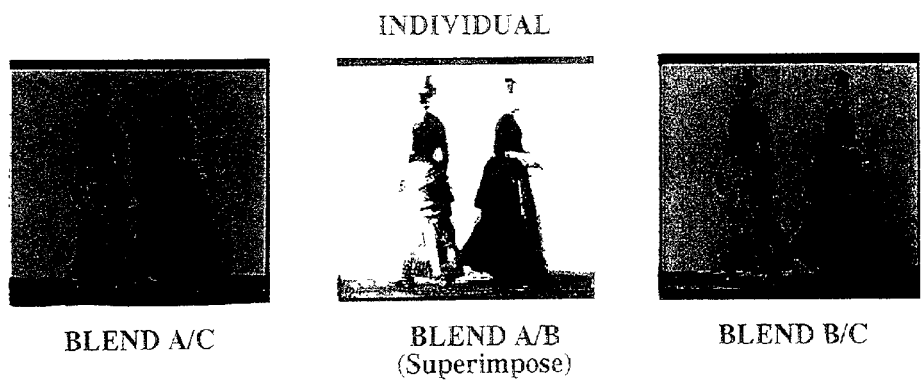
FIGS. 7a–7c illustrates the women of FIG. 6 with a 50—50 blend between the women and the women and the bridging frame.
Figure 7B:
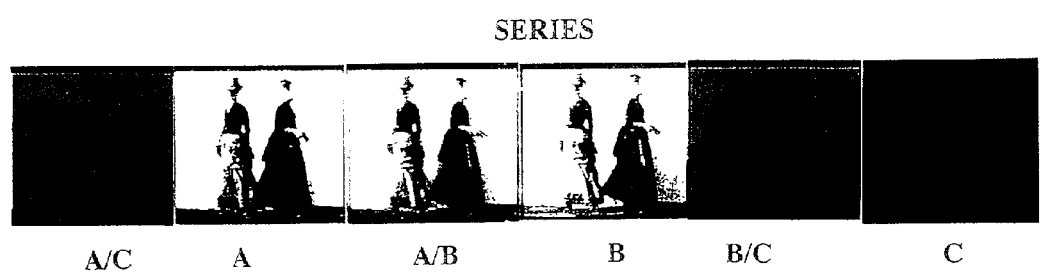
Figure 7C:
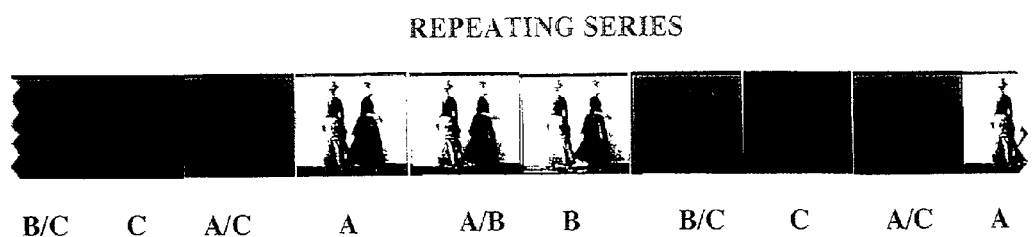

FIG. 7a demonstrates the creation of intermediary or blended frames between A, B and C, which are 50—50% blends producing A/C, A/B & B/C. FIG. 7b shows them in sequence and FIG. 7c shows them repeating as an ongoing loop.

Figure 8B:
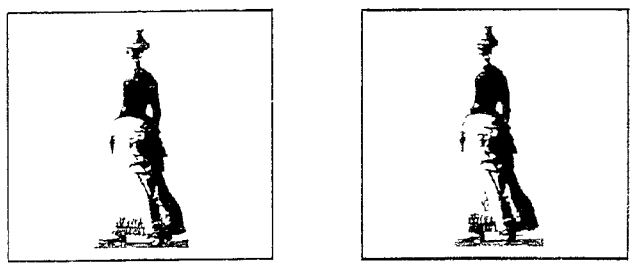
Figure 8B:
Figure 8C:
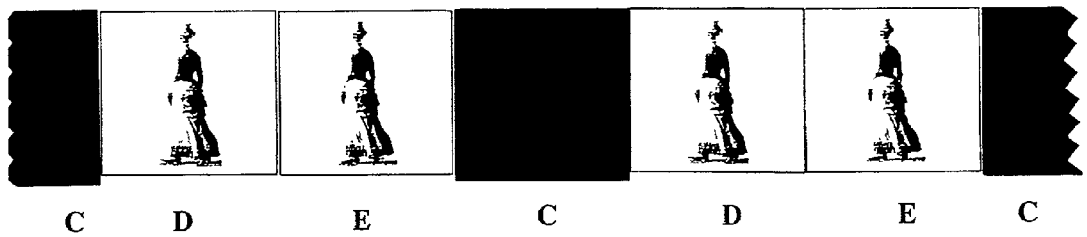

FIG. 8a shows one figure in isolation, removed from the previous scene. Pictures D & E may appear identical but are actually two different perspectives which together make possible a 3-dimensional figure. While the recording camera remained in a fixed position the figure moved before it, frame after frame, making two perspectives possible. Because the figure moved to different positions in the two film frames, it was necessary to move one figure in one frame so that both figures would occupy the same location in both frames. It is now possible to see them as a single 3-dimensional figure when the frames cycle in quick succession together with the bridge frame as shown in FIG. 8c.

Figure 9A:
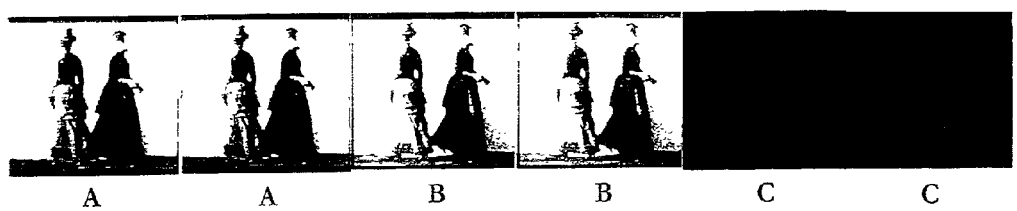
FIGS. 9a–9b illustrates the doubling of the frames from FIG. 6.
Figure 9B:
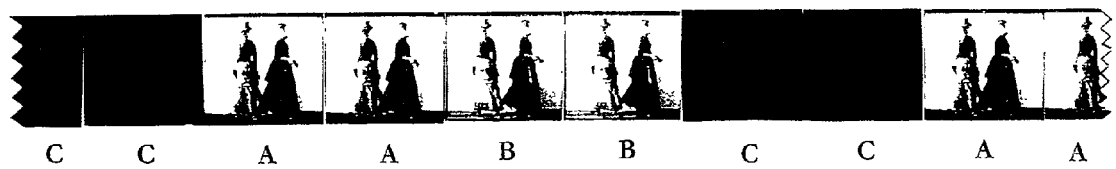

FIGS. 9a and 9b represents the doubling of each frame in an A,B,C series.

Figure 10A:
FIGS. 10a–10b illustrates the two women with a smaller frame depicting a portion of one woman repeated and overlayed in the upper left-hand corner of the frame to create a separate depth-configuration within the larger frame.
Figure 10B:
Figure 10C:
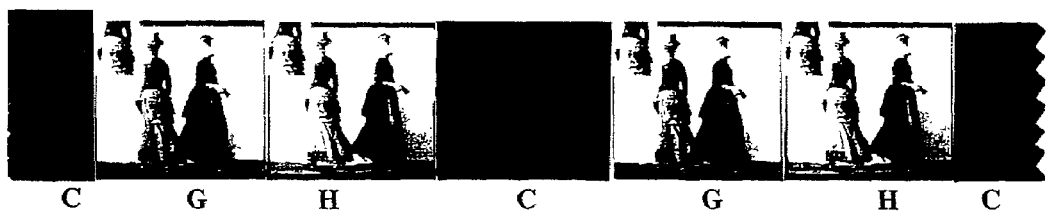

FIGS. 10a–10c shows a section of picture G & H is repeated in the upper left corner. When observed in quick succession this series will show the two center figures in one configuration of depth and the inset series as an opposing configuration of depth. Left eye/right eye views as placed in G & H are reversed in the inset figure, so that parts of the figure that (3-dimensionally) approach the viewer in the larger picture are seen to retreat away from the viewer in the smaller picture, and visa versa.

Figure 11:
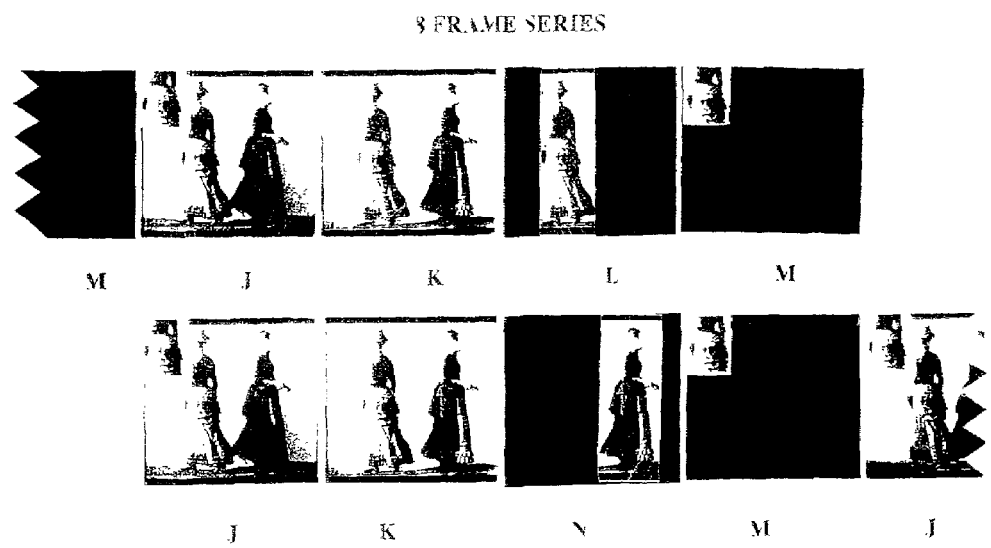
FIG. 11 illustrates a combination of the two women with a portion of the one woman both in the bridging frame as well as in one of the frames that contain both women.

FIG. 11 illustrates two sets of four; with both similarities (J, K, M) and differences (L, N) between the sets, including in the upper left corner an action that straddles bridging frame (M) and picture frame (J). Note the bridging frame is not completely blank or colored.

Figure 12:
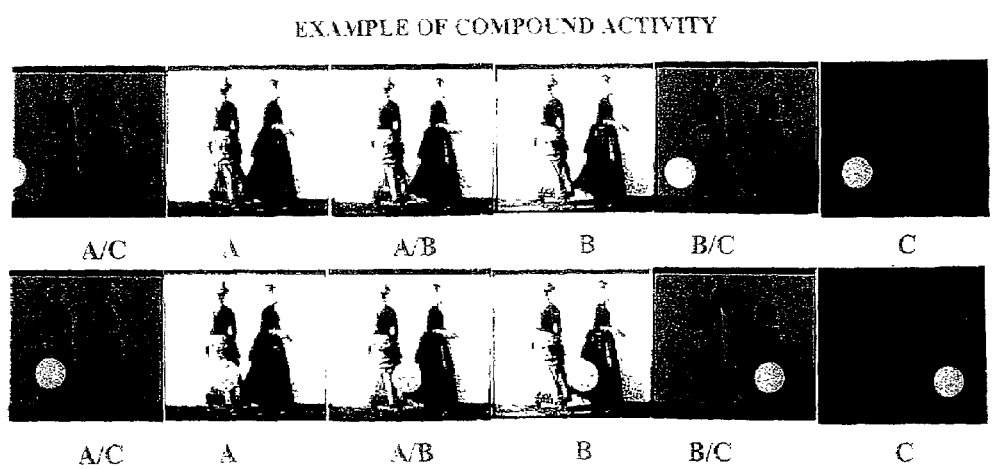
FIG. 12 illustrates Eternalism with two women and a circle moving through the frames.

FIG. 12 illustrates an example of an Eternalism effect coexisting with more normal screen action, and of an Eternalism repetition taking place but with no two frames exactly alike: a visual element (the circle) proceeds frame to frame throughout as it would in a normal movie, unaffected by Eternalism looping. Again, note that the bridging frame is not completely blank.

Figure 13:
FIG. 13 illustrates the Pulfrich filter.
Figure 13:
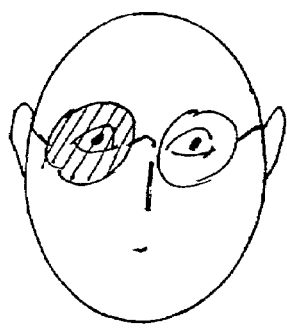
Figure 13:
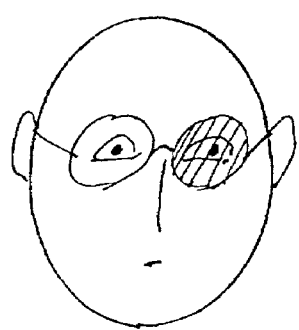

FIG. 13 is an illustration of Pulfrich filter spectacles: (1) clear; (2) activated to partly block light reaching figure's right eye; (3) activated to partly bock light reaching figure's left eye. Liquid crystal reaction is one method of achieving the blocking effect.

The invention can also be described as follows:

In the Pulfrich filter effect, interference by the light-reducing filter has the effect of retarding the light that does pass through it to the eye. As long as forms and objects are changing position relative to each other as pictured frame to frame, a delayed picture seen in combination with a present-moment picture offers two slightly different pictures simultaneously to the mind. Thus an artificial three-dimensional image can be produced by the mind utilizing the same mechanisms that allow it, in viewing actuality, to produce a three-dimensional mental image from the pair of two-dimensional perspective-images received from horizontally adjacent eyes. The artificial 3-D image can be said to depend on a variable report of actuality. A Pulfrich filter used to view actual three-dimensional space will distort that space (assuming the scene is in motion). Similarly, depth in a screen-image can be distorted, and in manifold ways, including reversal of near and far and direction of motion flow. Such distortions can have expressive artistic value.

The Puifrich Effect, triggered (as described above) to accord with pictured directional motion on-screen, would have applications beyond use with Eternalized movies. Video games and other video movies featuring extended screen movements to left or right could, in many instances, be enhanced for viewers by Pulfrich projection into three-dimensional depth. For many such screen events for instance, a scene filmed or videotaped from a moving vehicle, especially perpendicularly, with the camera aimed at or close to a 90 degree angle from the side of the vehicle, convincingly realistic deep space would result. A stipulation of realistic deep space, as made available by the Pulfrich Effect, is that the partial light-absorbing filter be before the eye on the side to which the pictured foreground objects are seen to move. If filming or videotaping was to be done with the camera aimed perpendicular to a vehicle's path of movement, and the camera was on the driver's side, motion onscreen would flow screen-left, and the Pulfrich filtering would therefore have to take place before the left eye; thus the need to switch dark-filter placement from eye to eye in accordance with direction of screen movement. The filter works best when there is essentially horizontal movement; when viewing an unmoving or inappropriate image, both left and right eye filters should clear. Presented as electronic media, such images would benefit from timed application of appropriate Pulfrich filtering. This aspect of the invention would allow 3-dimensional movies to be created and presented (less spectacles) with the same cinema technology used for making and presenting ordinary 2-dimensional movies.

Description of the Eternalism Optical Phenomena

The idea of an interval of action running in place without apparent beginning, middle and end, forever swelling or turning or rising or opening, forever seeming to evolve without ever actually doing so (until given a determined release into a further phase of development), can be literally unimaginable, so alien is it to our experience. Neither in life or on film or in electronic imagery has it been possible to create the optical illusion of a door forever cracking open or a muscle rippling or head turning or any other limited gesture continuing as such into potentially unlimited time—until advent of this invention. We have termed this phenomenon Eternalism, and we speak of pictured forms or objects, scenes or gesture being Eternalized into Eternalisms. A further benefit of this invention is enhanced 3-Dimensionality of Eternalized images, a 3-D that can be reasonably life-like or radically at odds with depth as we know it.

Consider, for example, the action of a door opening. And select from that entire action only the fraction of time that it would take for the door to just begin to open, as it cracks open a narrow space alongside the doorframe, with the outer edge of the door swinging over little more than an inch of flooring. Designating this very limited time-space interval as a movie "shot". The most minimal movie shot possible, it consists of only two running frames of film or video.

In reality, there would be no way to sustain into unlimited time the very limited action of the door cracking open; to keep opening and only opening yet never moving past that very limited phase of just cracking open. This motion is not repeated but sustained. The reality, of course, is that to remain in motion, and in forward motion only, one would have to move the door to a further phase of motion: the door would have to open wider. And the designated space-time interval would be left behind.

This is similar to someone walking against the direction of a conveyer belt walkway (as at an airport) and at exactly the same speed of the conveyer belt, continually walking forward yet getting nowhere. The Eternalism technique is a sort of cinematic conveyer belt moving in an opposing direction to any moving image placed on it.

It is a conveyer belt with a beat, a flicker, a visual beat capable of supple changes. In the history of cinema, flicker—referring to visible intervals of darkness between flashes of successive film-frames, intrusive reminders of the mechanical basis of the cinematic illusion—has been a pejorative term. To commercially entertain, the technology needed to quickly outgrow flicker. Yet in doing so some other illusionistic potentials of the art, very curious departures from life-like representation, were never discovered, their expressive potential left untapped, until now.

Method

Visible flicker is essential to Eternalism technique, which investigates and utilizes different intensities of emphasis, frame choices and frame-counts of flicker in order to create entirely new illusions to augment cinema's repertoire of visual effects. Today's audiences are entirely receptive to non-realistic representation, the textures of visual technologies are no longer unwelcome onscreen. Visible flicker does sometimes appear in movies in purposeful ways, usually representing lightning or machine-gun bursts, and even as rhythmic hits of light-energy, but not with the methodology and results of Eternalisms.

No less than three basic units, two pictures and a bridge-interval (A, B, C), are necessary to create an Eternalism, even when picture B might be only a slight modification, a shifting or size reduction or expansion or tilting, etc. of picture A. On the simplest level, the series of units would proceed: A, B, C, A, B, C, A and so on. Each unit interval may be of any effective time duration, an effective smooth-working duration for computer assembling is two frames per unit, shown here as A,A, B,B, C,C, A,A, B,B, C,C, A,A and so on. It is sometimes desired to insert transitional frames, usually 50/50% (percentage mixture may vary) superimposed frames of adjacent units, shown here as: A, A/B, B, B/C, C, C/A, A and so on.

Additionally, all re-appearances of the basic cycling units comprising an Eternalism needn't be exactly the same. Strict mechanical repetition can give way to flexible variation within the limits imposed by what is necessary to sustain the motion/depth illusion (unless one chooses to abandon the illusion entirely for a period of time; it is expected that for commercial movie use of the method, that the effect would be used intermittently, for selected scenes). Any number of factors comprising a unit-sequence may be altered from appearance to appearance as it cycles, including colors, shapes, placement of shapes, objects pictures, unit duration, etc., so that the same Eternalism would seem to remain in play while going through subtle or even vibrant internal changes, before being replaced by a successive phase of motion or a distinctly other selection of picture/interval units. Change in the order of units, such as A, B, C, A, B, C, A being replaced by B, A, C, B, A, C, B would initiate an immediate reversal in direction of pictured movement. Varying durations of units within an Eternalism or traveling from Eternalism to Eternalism may not only make for desired beat and rhythm changes but also affect the apparent character of motion and/or depth in interesting ways. A composer of a series may even choose to play against its smooth continuity by momentary unit-replacement or interjection by other picture units, as for instance: A,A, B,B, C,C, A,D, B,B, C,E,C, A,A. The entire screen may Eternalize with the same sequential rhythm (usually the case) or different parts may sequence with different rhythms to different pictorial effect.

Many techniques commonly in use in computer and hand-crafted movie animation can be adapted to Eternalism use. For instance, similar to screen combinations of photographed reality with animation cartooning, only a section or sections of the screen image may be Eternalized while normal movie motion proceeds in other sections. Or a figure in normal motion may move through an Eternalized scene. Or, among other combination possibilities, a smaller Eternalism (which can be an object or shape or a separately framed scene) may be imbedded within a larger Eternalism, or may float before it, or move—substantial yet ghostlike—through it.

Stereo Vision and Special Requirements of Eternalism Composition

Eternalism images may be so composed as to create an impression of 3-dimensional volume, designed to appear more or less realistic, but never with the degree of realism as to fool anyone that they are other than images. No one will ever attempt to sink a hand into one to grab at passing fish as children do at Sony I-MAX. Eternalism depth is readily apparent and yet more problematic, as is its character of movement. Depth isn't simple there to be taken for granted, but seems constantly caught in the act of being generated out of flat elements. Eternalism is an illusion of depth. Our minds are given the task of entertaining together two conflicting impressions: of things simultaneously appearing both flat and deep. However, the degree of 3-dimensionality that is there can be seen without need of special viewing devices of any sort, and in fact can be seen by many persons normally deprived of any 3-dimensional vision (those missing sight in one eye, for instance).

Depth as well as ongoing movement must be artificially composed in the making of Eternalisms. Calculated placement of areas to be brought into working correspondence within a picture A and picture B is of paramount importance.

It does happen that images are recorded on film or in electronic media that work effectively enough when sequentially overlayed with each other as-is, so as to need little or no cut-and-paste rearrangement. But more often there are areas not adequately corresponding in sequential location and therefore, when alternated quickly, will merely bounce back and forth from place (in A-frame) to place (in B-frame). In normal stereo-vision ones two eyes angle in and out from parallel alignment as they match corresponding areas on their two retinal images. Each retinal image is in fact 2-dimensional; 3-dimension vision is a result of this muscular matching, this pulling-into-alignment activity performed by muscles surrounding the eyes (as dictated to by viewers focus of interest) activity by the eyes and the mental comparing and processing of like and unlike information sent by each eye to the brain. Only within a very limited interval of actual depth, up to about twenty five feet distance for most humans, can we effectively shift and overlay forms so as to discriminate depth accurately (eyes work in parallel beyond that distance, with greatly reduced depth distinction). The closer to the eyes the target of focus, the more the eyes have to cross, and the different degrees or angles of crossing demanded as things approach or recede means that while one layer of depth will be properly shifted to overlay figures, others will not be. Selective focusing and shift in real-life visual experience, selectively attending to the 3-D figures creates in the mind, while ignoring—helped by a "dominant eye"—the remaining non-overlayed and doubled flat figures remaining in the twin fields of vision, peripheral to the focus of attention.

Ignoring such peripheral mismatchings in Eternalisms does not come so naturally. Because the image pictures alternate in appearance, they don't quietly superimpose (with one image largely discarded from mind due to our having a "dominant eye"): non-overlayed areas will tend to jiggle and bounce, usually a distraction. Unless that is the effect wanted in a particular instance, the procedures of artificially overlaying A and B picture-areas for the viewer will be carried out throughout an Eternalism composition, into all peripheral areas of the picture. Again, this can be done employing computer graphics cut-and-paste techniques, with the filling of areas left emptied (by removal or shifting of a form) usually accomplished by the extending of adjacent colors.

Picture-frames A and B may be near-identical or have only some elements with close visual correspondence. Similarity of shape and location within the frame are important factors determining the effect. This is true to the point that entirely different pictured objects but of similar shape and on-screen location will give better results than two images of the same object recorded from perspectives too far apart or placed too far apart within consecutive frames, in which case the images will be seen to vibrate or bounce back and forth without visually combining into a single moving form. While matching image elements in pictures A and B must occupy almost the exact screen-space in order to combine properly, it will be the differences between them (within close tolerances) that will produce and determine the character of movement and dimensionality. Computer graphics cut-and-paste techniques can be used to select and place, shrink and expand and otherwise manipulate matching elements (from any source) into effective screen-locations relative to each other. One or both pictures may be collaged or stitched together from multiple sources, parts may be removed or inserted, lifted and reshaped or/and relocated. Even when the image is photographed from life and appears life-like, the process of composition can be as exacting and labor-intensive and involved with techniques of artifice as cartoon animation.

EMBODIMENTS

In practice, the implementation of this technique opens up a new world of visual effects. Its uncanniness may be emphasized to create unsettling time-space aberrations for comic or dramatic effect in movies. Or, aiming for more realistic appearance, the method could be used to provide more lively "snapshots" of familiar things and events. For instance, people could carry, programmed into a Palm Pilot-type "electronic wallet", a great many (low memory demanding) moving replicas of loved ones in characteristic living gestures, with heightened 3-dimensional presence. Even very limited movement, limited 3-dimensionality, can enormously augment and reinforce visual information: i.e., a child's face breaks into a smile. Again, the very low demand of electronic memory by an Eternalism (cycling as few as two picture-frames with an interval of darkness), makes possible extensively illustrated electronic catalogues or even encyclopedias, supporting hundreds and eventually thousands of Eternalized illustrations. A reader-viewer might observe a home appliance in operation. Or study a visual sampling of an ocean wave breaking in its sweep to shore, study it as has never been possible before, forever breaking from peak ascendancy. One may study a springing cat, sheath of muscles sliding over ribs continually, available for sustained observation; or follow a clear demonstration of the direction a screwdriver must turn to further imbed a screw. Any number of instances where stereo-dimensional action (often audio-accompanied, as audio also demands little computer-memory) would communicate so much more than a still and flat image, or even a moving but flat image.

It will be understood that the claims are intended to cover all changes and modification of the preferred embodiments of the invention herein chosen for the purpose of illustration which do not constitute a departure from the spirit and scope of the invention.

What is claimed is:

1. A method for creating an appearance of continuous movement with a plurality of picture frames using two or more pictures, said method comprising:
   a) selecting at least two image pictures which are visually similar, a first image picture and a second image picture;
   b) selecting a bridging picture which is dissimilar to said image picture;
   c) arranging said pictures in a sequential order to create a first series of pictures, said sequential order being one or more first image pictures, one or more second image pictures, and one or more bridging pictures;
   d) placing said first series of pictures on a plurality of picture frames wherein each picture of said first series is placed on a single frame; and
   e) repeating the first series of pictures a plurality of times to create a continuous plurality of picture frames having said first series thereon, such that when said plurality of picture frames are viewed an appearance of continuous movement is perceived by a viewer.

2. The method of claim 1 wherein said bridging picture is a solid black picture.

3. The method of claim 1 wherein step (c) comprises:
   c1) blending said first image picture with said bridging picture to obtain one or more blended first-bridging picture;
   c2) blending said first image picture with said second image picture to obtain one or more blended first-second picture;
   c3) blending said second image picture with said bridging picture to obtain one or more blended second-bridging picture; and
   c4) arranging said pictures in a sequential order of one or more of said blended first-bridging picture, one or more first image picture, one or more of said blended first-second picture, one or more of said second image picture, one or more of said blended second-bridging picture, one or more of said bridging picture to create a first series of pictures.

4. The method of claim 3 wherein said blending is accomplished with a computer.

5. The method of claim 4 wherein said blending is selected from the computer effects group consisting of additive dissolving, cross-dissolving, dissolving-fast fix, and dither dissolving.

6. The method of claim 3 wherein said blending is accomplished with an optical printer.

7. The method of claim 3 wherein said blending is accomplished with a rear screen projection device.

8. The method of claim 3 wherein said blending of said first and second picture comprises off-setting said first picture from said second picture by a small amount.

9. The method of claim 1 wherein said sequential order of said series is two first image pictures, two second image pictures and two bridging pictures.

10. A method for creating three-dimensional images from two-dimensional moving picture frames comprising:
    a) wearing a pair of eyeglasses that cover both a right eye and a left eye of a viewer of said two-dimensional moving picture frames, wherein each of said pair of eyeglasses can be clear or activated to reduce light intensity reaching the eye of the viewer; and
    b) activating one of said pair of eyeglasses to reduce light intensity reaching one of the eyes of the viewer and provide a delayed image to said one of said eyes, wherein said activation is synchronized with movement of objects of said two-dimensional moving picture frames and with no movement of objects both of said pair of eyeglasses are clear.

11. The method of claim 10 wherein each of said eyeglasses is liquid crystal display lenses.

* * * * *